FM RECORDING SYSTEM FOR DISPLAY OF TRANSIENTS

Filed June 19, 1964

Inventor
Robert M. Muir
by Dawson, Tilton, Fallon
Lungmus & Alexander Attys

Inventor
Robert M. Muir
by Dawson, Tilton, Fallon, Lungmus & Alexander Attys 3,376,505
FM RECORDING SYSTEM FOR DISPLAY OF TRANSIENTS Robert M. Muir, Ames, Iowa, assignor to Iowa State University Research Foundation, Inc., Ames, Iowa, a corporation of Iowa Filed June 19, 1964, Ser. No. 376,313
1 Claim. (Cl. 324—112)

ABSTRACT OF THE DISCLOSURE

A frequency modulated magnetic tape recording system for displaying transient response of a system including a frequency-modulated oscillator, a recording amplifier utilizing a voltage controlled unijunction transistor relaxation oscillator, a reproducing amplifier and demodulator employing a pulse counting type of demodulation, a single recording head for reading, erasing and writing. The head is controlled by two momentary switches and the tape deck may be any commercially available type.

This invention relates to a magnetic memory for displaying transients—which may be advantageously employed in laboratories and classrooms.

The examination of the transient response of a system is often the easiest way of evaluating its operating characteristics. If the system transient exists as an electrical signal, or if it can be transformed into one by a suitable transducer, it may be displayed on an oscilloscope.

Only a fleeting sight of a transient is possible with this direct approach, and that is usually insufficient for critical examination.

A device to display various types of transient response continuously has been desired for some time as an addition to laboratary test equipment and as an aid to classroom demonstration. Such device should be economical, portable, and easily understood by the student. The display should be available for viewing immediately or at any later time desired, and should quickly present the change in the waveform as some parameter in the circuit is changed. The desirable frequency range of this equipment is from zero to approximately 5 kc.

One common method of recording transients is to photograph the oscilloscope presentation, This is a satisfactory and widely used method, but it is not suitable for the usual laboratory and classroom demonstration. Another common method is to record the signals on paper by ink or electric pen. This method is good only for frequencies up to 100 c.p.s. The development for recording directly on paper with a light beam or a beam of electrons has increased the upper frequency limit to 5 kc. This equipment is quite expensive and is not well suited for classroom demonstration.

The best available equipment for classroom purposes is a memory oscilloscope. This would enable one to present a transient that can be viewed by all the students at the same time. Several of these memory oscilloscopes are available on the market. Though they satisfy the requirements perfectly, they also are very expensive.

It is therefore an object of the invention to provide apparatus for the display of transients, along with the method of using the same. Other objects and advantages may be seen in the details of construction and operations set down in this specification.

The invention is described in conjunction with the accompanied drawing, in which.

Figure 1:
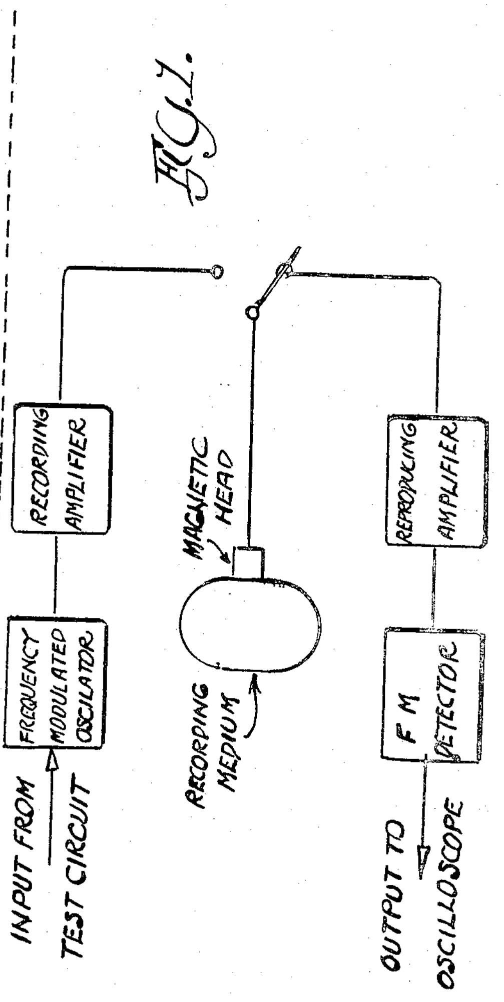
FIGURE 1 is a block diagram of the inventive display systems.

The memory element, i.e., the recording medium of FIGURE 1, is a 12" closed loop of standard ¼" magnetic tape moving at 15 inches per second. The FM recording and playback circuitry is completely transistorized in the best known mode of practicing the invention. The recording circuit utilizes a unit junction transistor oscillator, and the playback circuit employs a pulse counting type of detector.

FM recording was chosen over direct recording in developing the device herein described so that transients down to zero frequency could be presented. The circuitry for direct recording is less complex than that for FM recording, but in using conventional reproducing beads in the normal direct method, frequencies below 50 c.p.s. are lost in the noise level. This lack of low frequency response is due to the voltage induced in the reading head being directly proportional to the rate of change of flux. Therefore, very little signal voltage is induced in the reading head for low frequencies.

A speed of 15 inches per second was chosen because the high frequency response of the recording system is directly proportional to the speed of the tape. A high-frequency is desired for a center frequency in the FM system, since a higher modulating frequency can be used. The loop of tape was chosen to be 12 inches long because a repetition rate of less than one per second would not provide a suitable trace on the long persistence oscilloscope screen.

The contact recording with the loop of tape was at first believed to be undesirable due to excessive wear on the tape caused by contact with the head. But an audio signal recorded with the FM system had no noticeable deterioration after running in the reproduce mode continuously for 7 hours (31,500 plays). The tape loop appears to have more utility than the drum. If a permanent record of a particular transient were desired, that particular tape loop could easily be removed and stored. The tape transport could also be used with its normal reels of tape for many other uses.

Figure 2:
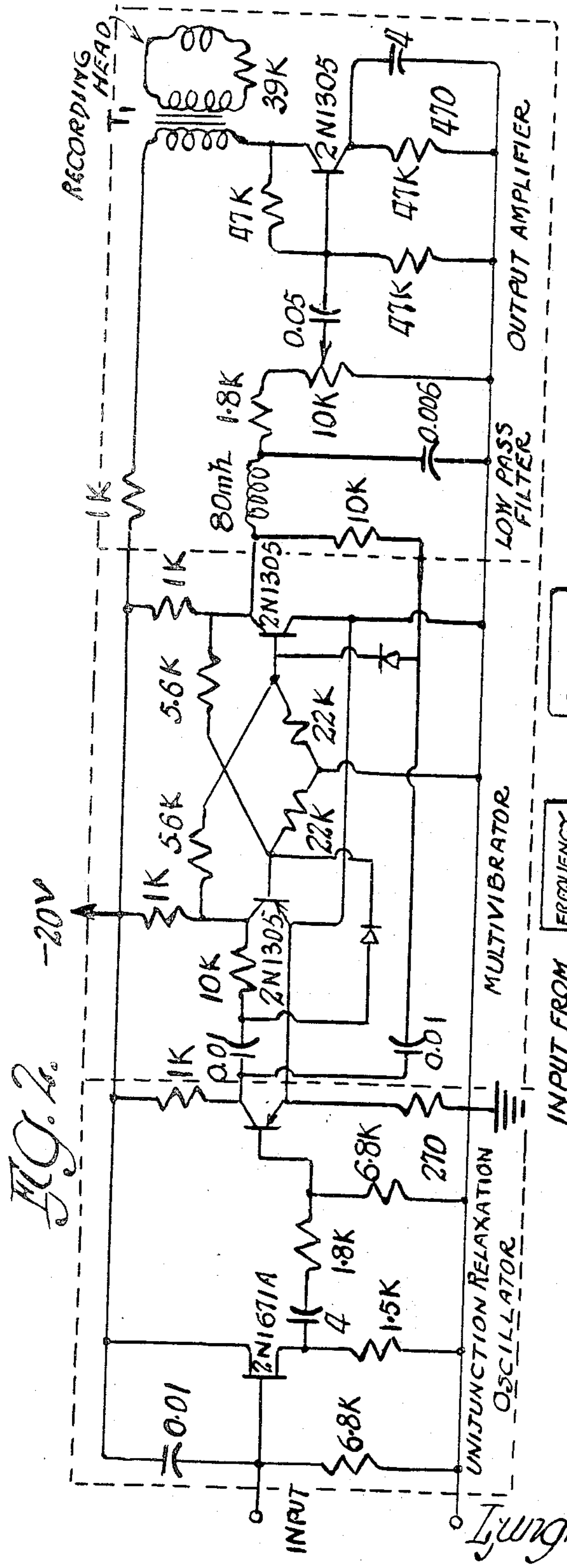
FIGURE 2 is a circuit diagram of a frequency modulated oscillator and recording amplifier employed in the system of FIGURE 1.

The voltage controlled oscillator is a unijunction transistor relaxation oscillator (FIGURE 2). A multivibrator is triggered by the pulses from the unijunction circuit, producing a square wave which is filtered before being amplified and applied to the recording head.

Figures 3, 4:
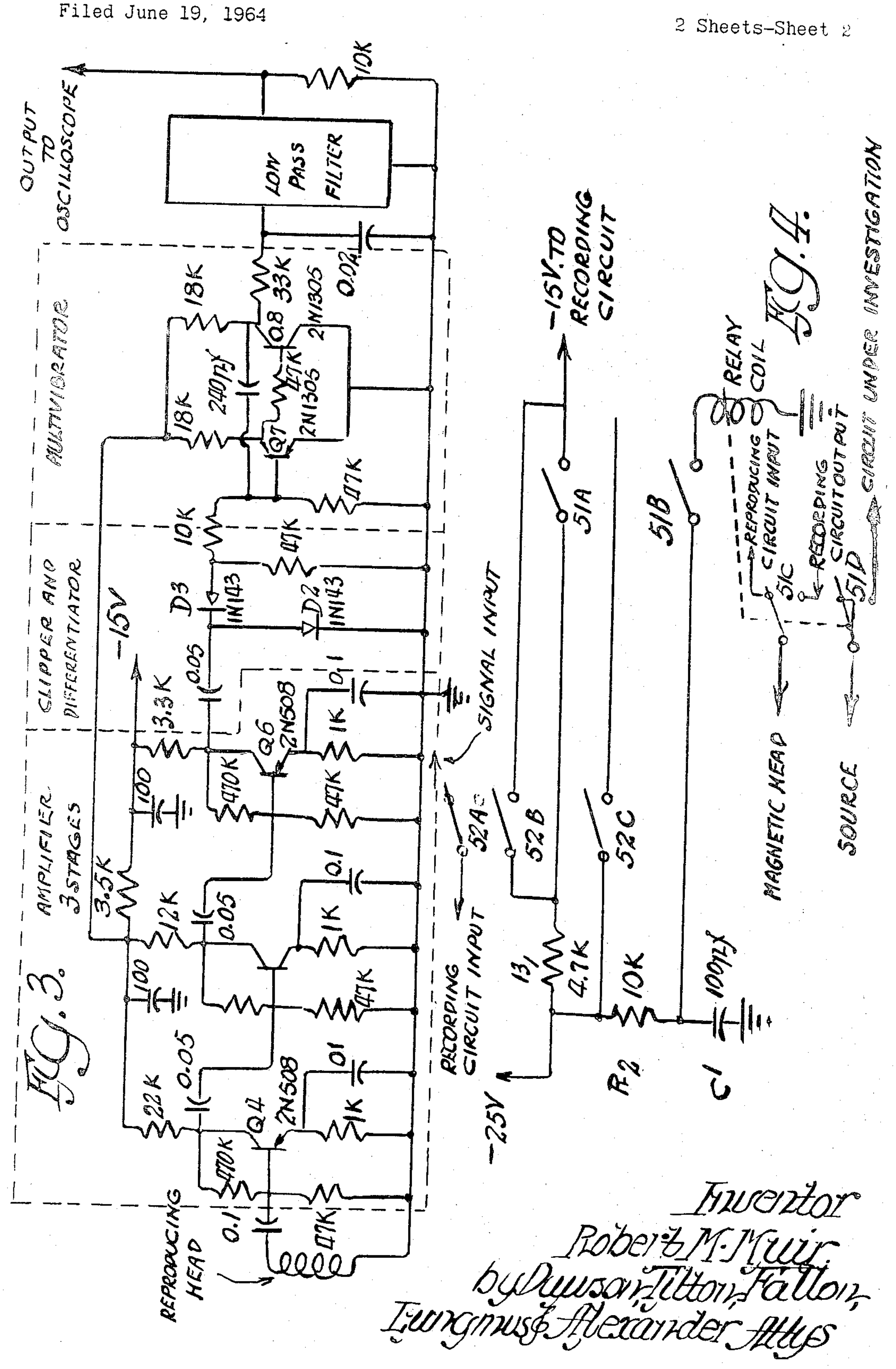
FIGURE 3 is a circuit diagram of a reproducing amplifier and demodulator (detector) also featured in FIGURE 1.
FIGURE 4 is a schematic diagram of the switching circuits employed in the operation of the circuit of FIGURE 1.

The circuit diagram of the reproducing amplifier and de-modulator shows the output of the head passing through three stages of amplification and limiting (FIGURE 3). The resulting square wave is differentiated and clipped, producing a negative voltage spike for each cycle of the input signal. This negative spike is used to operate a monostable multivibrator, the output of which is a square voltage pulse of constant time duration for each cycle of the input voltage. The average value of these pulses, obtained from passing the signal through a low pass filter, is the recovered modulation of the FM signal. The output of the properly terminated filter is fed directly to the oscilloscope input to present the transient signal.

Since one magnetic head is used for both the recording and reproducing functions, switching must be provided to switch the head from one circuit to the other and to insure that the head is removed from the recording function before one revolution of the tape has been completed (FIGURE 4). If the recording is not stopped before one revolution of the tape, the first part of the recorded signal is erased. Switches serving two independent functions and referenced in the drawing as 51 and 52 with their associated moveable contacts being separately referenced with an accompanying letter, are contained in the same double pole-double throw momentary switch. When switch 52 is held down, a zero level reference signal is recorded, erasing any previously recorded signal. When switch 51 is depressed, the relay is energized for 0.6 second providing the necessary time in the recording function.

OPERATING INSTRUCTIONS (1) Connect input signal to *Input Signal* terminals and oscilloscope to *Output* terminals.

(2) Connect desired test circuit source to *Test Circuit Source* terminals, and connect *Test Circuit Input* terminals to the test circuit input.

(3) Hold down switch 52 for a minimum of one second to record a zero reference level.

(4) Hold down switch 51 for a minimum of one second. The recorded signal will be displayed on the oscilloscope.

(5) If the signal is clipped or distorted, attenuate the input signal by any suitable conventional attenuating circuit and repeat Steps 3 and 4.

From the foregoing, it will be seen that I have provided a method and apparatus for displaying a tranisent response of a system which utilizes a suitable challenge (which may be a capacitor discharge) so as to produce a transient signal. This transient signal is employed to modulate a carrier (optimally FM) and thereafter the modulated carrier is recorded on magnetic tape. By suitable switching the inventive apparatus, the taped signal is recovered, demodulated and placed on an oscilloscope.

The system which was developed operated quite satisfactorily. The 1,000 c.p.s. upper limit to the frequency is adequate for most uses. This limit could be made higher by using a faster tape speed, but 15 inches per second is the fastest speed available in a normal consumer's model tape recorder. This system could be used with any available tape deck so long as the flutter is less than 0.2 or 0.3 percent. The flutter should be held to a minimum; variations in speed show up as a noise signal in the output of the FM system.

While in the foregoing specification a detailed description of the embodiment of the invention has been set down for the purpose of illustration, many variations of the details herein given may be made by those skilled in the art without departing from the spirit and scope of the invention.

I claim:

1. A recording system for displaying transient response signals of a circuit under investigation comprising: a voltage responsive unijunction relaxation oscillator receiving said transient signal for generating a train of pulses, the time between successive pulses being representative of the instantaneous amplitude of said transient signal; a multivibrator circuit receiving the output signal of said unijunction oscillator for generating a square wave signal representative of said oscillator output signal; low pass filter means receiving the output of said multivibrator circuit for filtering out high frequency components thereof; magnetic recording means including an endless magnetic tape for recording a signal, said recording means receiving the output signal of said low pass filter for storing the same on said tape and a single magnetic head for reading, writing and erasing the signal on said tape; read means including an FM detector coupled to said head for generating a signal representative of said input signal from said recorded signal; an oscilloscope receiving said reproduced signal for displaying the same; first switching means for writing a zero reference level signal on said tape; and second switching means for enabling said transient signal to be recorded on said tape for a period of time less than the time required for a complete cycling of said tape whereby said transient signal is recorded on said tape and displayed repeatedly on said oscilloscope.

References Cited

UNITED STATES PATENTS 2,583,983 1/1952 Arndt ----------- 324—112 X

RUDOLPH V. ROLINEC, *Primary Examiner.*

WALTER L. CARLSON, *Examiner.*

J. J. MULROONEY, E. F. KARLSEN, *Assistant Examiners.*